United States Patent [19]

Brooks et al.

[11] Patent Number: 4,732,614

[45] Date of Patent: Mar. 22, 1988

[54] NOVEL CORRECTION COMPOSITIONS AND PROCESS FOR USING SAME

[75] Inventors: Lamar E. Brooks, Wellesley, Mass.; Sue R. Liu, Rogers, Ark.

[73] Assignee: The Gillette Company, Boston, Mass.

[21] Appl. No.: 755,256

[22] Filed: Jul. 15, 1985

[51] Int. Cl.[4] .................... B41M 5/22; C09D 11/00

[52] U.S. Cl. .................................... 106/21; 106/23; 427/140; 427/141; 427/150; 427/152; 427/153; 503/201; 503/209; 503/212; 503/213; 503/214; 503/219; 503/225

[58] Field of Search .................. 106/14.5, 21, 23, 20, 106/22, 19; 427/141, 150–152, 140; 428/195, 211, 914; 346/201, 206, 209, 212, 213, 215, 219, 225, 214; 503/214

[56] References Cited

U.S. PATENT DOCUMENTS

| | | | |
|---|---|---|---|
| 3,276,870 | 10/1966 | Bitting et al. | 96/27 |
| 3,997,498 | 12/1976 | Reese | 260/33.8 |
| 4,275,906 | 6/1981 | Johnson et al. | 282/27.5 |
| 4,347,282 | 8/1982 | Ehrhardt et al. | 346/212 |
| 4,348,234 | 9/1982 | Cespon | 346/212 |
| 4,521,793 | 6/1985 | Kabashima et al. | 346/201 |

FOREIGN PATENT DOCUMENTS

| | | | |
|---|---|---|---|
| 0041782 | 12/1981 | European Pat. Off. | 106/20 |
| 0044818 | 3/1980 | Japan | 346/212 |
| 2022013 | 12/1979 | United Kingdom | 106/20 |

*Primary Examiner*—Bruce H. Hess
*Attorney, Agent, or Firm*—John P. Morley

[57] ABSTRACT

Correction compositions for correcting markings provided on the surface of a pressure-sensitive chemical recording medium carrying a developer material which comprises an acidic developer by interaction of the developer material with a color-providing material. The compositions comprise a substantially uniform dispersion of an opacifying pigment, a polymeric film-forming material, and a Lewis acid. The composition is applied to a marking to provide a film which covers the marking, and a visible correcting marking can be provided on the film by applying a pattern of color-providing material corresponding to the corrected marking to the film.

22 Claims, No Drawings

NOVEL CORRECTION COMPOSITIONS AND PROCESS FOR USING SAME

BACKGROUND OF THE INVENTION

1. The Field of the Invention

This invention relates to novel, improved correction compositions for correcting markings recorded on pressure-sensitive chemical recording materials and to novel, improved processes for correcting markings on pressure-sensitive chemical recording materials.

2. Description of the Prior Art

Pressure sensitive chemical recording materials are known products of commerce. They usually take the form of a set of two sheets of recording materials, one having a coating back (CB) and the other having a coated front (CF). The coated back sheet usually provides the cover sheet for the set and carrys on the back surface a color-providing material which is usually colorless. The coated front sheet carrys color developer material on the front sheet, and the back and front sheets are arranged in superposed relationship. In practice, pressure is applied to the surface opposite the back sheet surface such as by a writing, typing, or printing instrument to cause release of the color-providing material for interaction with the color developer material. Upon separation of the sheets, a visible image pattern is provided in the front surface which corresponds to the pattern of applied pressure.

Compositions for correcting conventional ink markings on recording materials such as paper are also known products of commerce, and their desired combination of performance characteristics are well defined. Essentially the primary combination of performance characteristics of such compositions involve the capability to completely and effectively cover erroneous markings on a paper surface and provide a film for corrected markings which is strongly bonded to the surface but also sufficiently flexible so that the film will not be removed from the surface such as by cracking or flaking when the corrected sheet is subjected to handling and folding conditions. Additionally, the film should have a color closely matching the color of the paper and provide a texture or surface closely corresponding to those of the paper. Other desired performance characteristics include good storage stability, flow and viscosity characteristics providing easy and even application and, fast drying so that corrections can be made relatively quickly. While the above-described compositions are effective for correcting conventional ink markings, they are not suitable for pressure-sensitive recording materials. In addition to all the performance characteristics described above, an effective composition for correcting markings in chemical pressure-sensitive recording materials must be both capable of covering the marking and also provide means to effectively restore the imaging capability of the recording materials to provide a visible, corrected marking in the covered area. The present invention is directed to the outstanding need in the art to provide an effective correction composition for pressure-sensitive chemical recording materials and presents an especially effective response to that need.

BRIEF SUMMARY OF THE INVENTION

The present invention presents to the art novel, improved correcting compositions for effectively correcting visible markings provided in pressure-sensitive chemical recording materials by interaction between a color-providing material and an acidic developer. Essentially, the correction compositions of the invention comprise a dispersion of an opacifying pigment, a polymeric film-forming binder material, and a Lewis acid or electron acceptor. In the improved process presented by the present invention, the compositions are applied to visible markings on the front surface of pressure-sensitive chemical recording materials to provide a film which can effectively cover markings and, at the same time, restore the capability of the recording materials to provide a visible corrected marking. A corrected marking is provided on the surface of the film by superposing a pressure-sensitive chemical-recording sheet on the film so that the surface of the sheet which carrys the color-providing material (CB) is in contact with the film and applying a pattern of color-providing material corresponding to the corrected marking to the film.

DESCRIPTION OF PREFERRED EMBODIMENTS

The correction compositions of this invention are non-flammable, substantially non-toxic, rapid drying dispersions. Essential ingredients of the correction compositions of the invention include an opacifying pigment, a polymeric film-forming binder material, and a Lewis acid, all substantially uniformly dispersed in a fluid medium.

A fluid medium suitable for compositions of the present invention is one in which the polymeric film-forming binder material is preferably substantially completely soluble. Additionally, the fluid medium should not have such a high volatility that the fluid will have an unacceptably short shelf like or have a vapor pressure so low that it will evaporate too quickly. Preferred fluid mediums are organic solvents having boiling points between about 60° to about 85° C. Halogenated ethanes containing three or more chlorine atoms or halogenated ethanes including chlorine and one or more fluorine atoms provide suitable fluid mediums for correction compositions of the invention. Specific suitable fluid mediums include 1,1,1, trichloroethane, 1,1,2 trichloroethane or mixtures of these with other halogenated ethanes. The amount of fluid medium used should be sufficient so that the correction composition can be readily applied to a surface to be corrected and can provide free flow characteristics and a relatively thin film of the composition after application. Accordingly, the amount of fluid medium can vary depending upon the type and amount of pigment and polymeric material in the composition, but the effective amount for any given formulation can be determined by routine experimentation. Representative suitable amounts of fluid medium are between about 80 to about 125 parts by weight based on the total weight of the composition.

Lewis acids suitable for use in the corrective compositions of the present invention are those electron acceptors which can interact with the color-providing material of the chemical recording material to provide a visible marking in the film covering the marking to be corrected. Suitable Lewis acids include $AlCl_3$, $ZnCl_2$, $CaCl_2$, acid-activated clays such as acid-activated bentonite and acidic polymers such as phenolaldehyde polymers among others. The amount of Lewis acid can vary, but amounts between about 0.5 to about 15 parts by weight are normally suitable. The preferred Lewis acid is $ZnCl_2$ and, in the preferred practice of the invention, the $ZnCl_2$ is dissolved in a suitable solvent when added to the composition. Preferably, the amounts of $ZnCl_2$ and solvent are substantially equivalent, and the most preferred solvent is ethanol.

Polymeric film-forming binder materials suitable in the present invention are preferably substantially completely soluble in the fluid medium since the amount of fluid medium will decrease as a container of the fluid is exposed to the atmosphere. This decrease and lowering of fluid medium content can cause rapid increases in the viscosity of the composition. Additionally, the dispersion of polymeric material and fluid medium must be compatable with other materials included in the composition. Polymeric film-forming binder materials having reduced polar characteristics are generally suitable in the practice of the present invention. The preferred polymeric film-forming, binder material are vinyl toluene acrylics which are soluble in odorless mineral spirits. Other suitable, commercially available polymeric film-forming binder materials include chlorinated rubbers, acrylic resins such as methylmethacrylate, n-butyl methacrylate and isobutyl methacrylate and vinyl polymers such as vinyl chloride-vinyl acetate copolymers and mixtures of such polymeric materials. The amount of polymeric film-forming binder materials used can vary and amounts between about 3 to about 20 parts by weight are normally suitable.

Those skilled in the art of correcting compositions know that a variety of pigments can be included in the selected combination of fluid medium and polymeric film-forming binder material(s). Basically all correction compositions include titanium dioxide as opacifying pigments to provide the basic white color which can be toned to provide a correction composition closely corresponding to the color of the paper to which the composition is intended to be applied. Suitable titanium dioxide pigments include commercially available rutile titanium dioxides and anatase titanium dioxides or mixtures of these which preferably have an average particle size between about 0.2 to about 0.4 microns and an average oil absorption of about 14 lbs. oil/100 lbs. pigment to a about 36 lbs./100 lbs. The amount of titanium dioxide included in the composition can vary depending primarily on the degree of covering desired. However, amounts between about 30 to about 70 parts by weight are generally suitable. Other opacifying pigments may be used either alone but preferably in combination with the titanium dioxide. Such pigments include zinc sulfide, zinc oxide, and basic lead carbonate or sulphate. Colored pigments may also be used for matching the color of the correction composition to the color of the paper to which the composition is applied.

In addition to the four primary components of the correcting compositions, i.e. the Lewis acid, the pigment, the polymeric material, and the fluid medium, the compositions may include a non-volatile plasticizer which is preferably soluble in the fluid medium. The plasticizer is used to reduce embrittlement and improve adhesion and flexibility of the film formed by the composition thereby minimizing chipping off or flaking of the film. Suitable specific plasticizers include dioctyl phthalate, dibutyl phthalate, low molecular weight polystyrene, mineral oil, tricresyl phosphate, and castor oil and amounts of plasticizer between about 0 to about 10 parts by weight are normally suitable. However more or less can be used if needed or desired.

A dispersing agent may also be employed in the correction composition of the present invention in order to stabilize the composition and assure that the covering power provided by the pigment(s) is substantially evenly distributed throughout the dispersion. Suitable commercially available dispersing agents include those sold under the tradenames NUOSPERSE 657 and DUOMEEN TDO sold by Tenneco and Armak respectively, and the amounts used can vary but amounts between 0 to about 10 parts by weight of the composition are normally employed.

Other additive materials which can be included in the correction compositions include toners such as a selected grade of carbon black to obtain the desired shade of white. Other toners such as colored pigments or dyes can be suitably employed to obtain compositions of desired colors for use on correspondingly colored papers. Additionally, effective amounts of thickening agents can be employed as thixotropic agents to control settling of the dispersed materials. Amounts of thickening agents between about 0 to about 5 parts by weight are normally suitable.

Suitable representative correction compositions of the present invention include those comprising a Lewis acid in combination with the ingredients of the correction compositions disclosed and claimed in commonly owned U.S. patent application Ser. No. 8,797 filed Feb. 1, 1979, by Gerald L. Hurst and now abandoned. U.S. patent application Ser. No. 8,797 is expressly incorporated herein by reference. Essentially, the correction compositions of application Ser. No. 8,797 comprise an organic solvent and a polymeric material for depositing a covering pigment and forming a film and where the combination of solvent and polymeric materials exhibit miscibility characteristics of M number about 22 or greater. Improved correction compositions are obtained by selecting solvent polymeric materials and other ingredients of the composition to insure that a certain level of miscibility (characterized by the M number) is retained.

Representative suitable compositions of the present invention, including ingredients of the compositions of the U.S. application Ser. No. 8,797, are set out below.

TABLE I

| Ingredient | Range (Parts by Weight) | Preferred Range (Parts by Weight) |
|---|---|---|
| Pigment | 30–70 | 40–60 |
| Polymeric Material | 3–20 | 5–15 |
| Lewis Acid | 0.5–15 | 1–8 |
| Fluid Medium | 80–125 | 90–110 |
| Plasticizer | 0–10 | 1–5 |
| Dispersing Agent | 0–10 | 1–5 |
| Thickening Agent | 0–5 | 0–3 |

The above compositions may also include a toner in an amount sufficient to provide a composition of a desired color for use on a correspondingly colored paper. Accordingly the amount of toner can vary over a wide range from about 0 to about 50 parts by weight or somewhat higher with the preferred range being from about 0.5 to about 25 parts by weight.

The invention as well as manners of making and using it and the advantages derived from it will be more fully appreciated from the following Examples offered only for the purposes of illustrating the invention and not to limit the scope of the invention as claimed.

EXAMPLE 1

This Example illustrates the preparation of a base correction fluid composition including the ingredients listed below.

| Ingredient | Parts by Weight |
|---|---|
| Titanium Dioxide[1] | 50 |
| Vinyl Toluene Acrylic Polymer[2] | 10 |
| $ZnCl_2$ | 1.25 |
| 1,1,1-Trichloroethane | 100 |
| Dioctyl Phthalate | 3 |
| Dispersant[3] | 3 |
| Ethanol | 1.25 |

[1]The titanium dioxide used was a commercially available titanium dioxide sold under the trademark TI-PURE R931 by E. I. duPont de Nemours & Co.
[2]The vinyl toluene acrylic polymer used was a commercially available polymer sold under the trademark PLIOLITE OMS by Goodyear Tire and Rubber Co.
[3]The dispersant used was a commercially available N—tallow-1,3-diaminopropane dioleate sold under the trademark DUOMEEN TDO by Armak.

The above base correction composition was prepared by first mixing a portion of the 1,1,1-trichloroethane with the vinyl toluene acrylic polymer until the polymer was dissolved. the dioctyl phthalate and dispersant were then added to the solution and mixed, and the titanium dioxide was then added to the solution to provide a slurry which was homogenized at 1500 psi for about four minutes/gallon. The remaining 1,1,1-trichloroethane and a 1:1 solution of $ZnCl_2$ and ethanol were then added to the homogenized dispersion with mixing. Percent solids for the correction composition was 40 percent by weight.

The correction compositions of the invention are used to correct markings on pressure-sensitive chemical recording papers which provide visible image patterns by the interaction of a color-providing material with an acidic color developer material. Pressure-sensitive chemical recording papers sometimes called "carbonless" papers or "NCR" (No Carbon Required) papers, which employ the above visible image pattern-providing systems are known products of commerce. The common factor in the above commercial products involves a set of two sheets of paper. One sheet of paper has a back surface carrying a color-providing material with the back surface superposed on the front surface of a second sheet of paper which carrys an acidic color developer material. Pressure activates the interaction between the color-providing and color-developing materials to provide a visible image pattern in the front sheet which corresponds to the pattern of activating pressure. Representative suitable color-providing materials and acidic color-developer materials used in such commercial products are described in detail in U.S. Pat. No. 4,275,906.

EXAMPLE 2

This example illustrates the preparation of a white color-correction composition of the present invention. The toner ingredients in the amounts listed below were added to and dispersed with mixing in the base correction composition of Example 1:

| Ingredient | Parts by Weight |
|---|---|
| Raw Umber* | 0.58 |
| Lamp Black* | 0.02 |
| Yellow Oxide* | 0.06 |
| Lead Free Primrose* | 0.07 |

EXAMPLE 3

This example illustrates the preparation of a yellow color-correction composition of the present invention. The toner ingredients in the amount listed below were added to and dispersed with mixing in the base correction composition of Example 1.

| Ingredient | Parts by Weight |
|---|---|
| Raw Umber* | 0.64 |
| Lead Free Primrose* | 8.82 |

EXAMPLE 4

This example illustrates the preparation of a pink color-correction composition of the present invention. The toner ingredients in the amounts listed below were added to and dispersed with mixing in the base correction composition of Example 1.

| Ingredient | Parts by Weight |
|---|---|
| Raw Umber* | 0.59 |
| Lead Free Medium Orange* | 3.40 |

*All colorants are from the 866 Series g colorant concentrates manufactured by Nuodex, Inc.

EXAMPLE 5

This example illustrates the use of the composition of Example 2, 3, and 4 to correct markings in commercially available pressure-sensitive chemical recording papers. The recording paper used in this Example are sold under the trademark NCR PAPER by Appleton Papers, Incorporated. Essentially the recording paper includes 4 superposed sheets. In the paper designated as $P_1$ in the Table below, the first and second sheets were white in color while the third sheet was yellow, and the fourth sheet was pink. In the paper designated as $P_2$, the first sheet was white, the second was yellow, the third was pink, and the fourth was white. The first, second, and third sheets of papers $P_1$ and $P_2$ had a coating on the back surfaces (CB) which comprised a color-providing material including encapsulated leuco dyes. The second, third, and fourth sheets of papers $P_1$ and $P_2$ had a coating on the front surface (CF) which comprised an acidic color-developing material which included a phenolic resin. The $P_1$ paper in the Table below, involved color-providing and acidic color-developer material combination which provided a black marking or the front surfaces of the second, third, and fourth sheets on the application of pressure to the front surface of the first sheet. The $P_2$ paper in the Table below, involved a color-providing and acidic color-developer combination which provided a blue marking on the front surfaces of the second, third, and fourth sheets.

In order to demonstrate the effectiveness of the correction compositions of the present invention, comparative correction compositions were prepared. These comparative correction compositions are designated as Example 20, Example 30, and Example 40 in the Table below. Examples 20, 30, and 40 are substantially identical to the correction composition of Examples 2, 3, and 4 respectively but do not contain $ZnCl_2$.

The Table below presents reflectance value measurements obtained using a Macbeth PCM II Reflectometer. The reflectance value designated as FS is the measurement of the reflectance value of the unmarked surfaces of the front sheet of the second, third, and fourth sheets. Reflectance value M is the measurement of the reflectance value of a marking on the front surfaces of the second, third and fourth sheets which marks were obtained on the surfaces by the application of the pressure of a marking instrument on the front surface of the first sheet. Reflectance value L is the measurement of the reflectance value of the layer of correction composition applied to above marking on the surfaces of the second, third, and fourth sheets. Reflectance value CM is the measurement of the reflectance value of the corrected marking provided in the layer of the correction composition.

TABLE

| | | | | | | |
|---|---|---|---|---|---|---|
| Pressure Sensitive Paper | $P_1$ | $P_1$ | $P_1$ | $P_1$ | $P_1$ | $P_1$ |
| Correction Composition | Ex. 2 | Ex. 3 | Ex. 4 | Ex. 20 | Ex. 30 | Ex. 40 |
| Reflectance Value FS | 79.5 | 79.3 | 61.0 | 79.5 | 79.3 | 61.0 |
| Reflectance Value M | 34.1 | 33.0 | 29.0 | 34.1 | 33.0 | 29.0 |
| Reflectance Value L | 77.4 | 71.2 | 62.0 | 79.3 | 79.2 | 64.5 |
| Reflectance Value CM | 36.8 | 39.3 | 35.5 | 45.6 | 65.5 | 49.6 |
| Pressure Sensitive Paper | $P_2$ | $P_2$ | $P_2$ | $P_2$ | $P_2$ | $P_2$ |
| Correction Composition | Ex. 2 | Ex. 3 | Ex. 4 | Ex. 20 | Ex. 30 | Ex. 40 |
| Reflectance Value Fs | 80.0 | 76.7 | 63.2 | 80.0 | 76.7 | 63.2 |
| Reflectance Value M | 32.1 | 26.4 | 20.4 | 32.1 | 26.4 | 20.4 |
| Reflectance Value Z | 78.1 | 70.7 | 62.2 | 79.7 | 79.8 | 64.7 |
| Reflectance Value CM | 37.7 | 46.9 | 38.4 | 55.1 | 68.2 | 52.3 |

From the above description, it will be apparent that the novel, improved compositions of the invention provide especially effective correction compositions for pressure-sensitive, chemical-recording materials. They can provide films which effectively cover markings for correction and at the same time are capable of interaction with color-providing materials carried on the back surfaces of the superposed paper to provide corrected markings of excellent quality. Correction of markings in such chemical-recording materials is achieved in a relatively rapid and simple but extremely effective fashion. Accordingly the invention presents to the art novel correction compositions which are unexpectedly different from those known to the art at the time the present invention was made.

What is claimed is:

1. A composition for correcting a marking on the surface of a pressure-sensitive chemical recording medium including a developer material comprising an acidic developer, said marking having been provided by interaction of the developer material with a color-providing material, said composition consisting essentially of a substantially uniform dispersion of from about 30 to about 70 parts by weight of an opacifying pigment, from about 3 to about 20 parts by weight of a soluble polymeric film-forming binder material, from about 0.5 to about 15 parts by weight of a Lewis acid and from about 80 to about 125 parts by weight of a solvent for the binder material, said composition providing a film which can cover the marking and can provide a visible corrected marking on contact with a pattern of said color-providing material corresponding to the corrected marking.

2. A composition of claim 1 where the color of the composition closely corresponds to the color of the surface having the marking.

3. A composition of claim 1 where the pigment; binder and Lewis acid are dispersed in a non-flammable organic solvent having a boiling point between about 60° to about 85° C.

4. A composition of claim 3 where the solvent comprises 1,1,1-trichloroethane.

5. A composition of claim 2 or claim 3 where the pigment comprises a titanium dioxide.

6. A composition of claim 2 or claim 3 where the polymeric film-forming binder material comprises a vinyl toluene acrylic polymer.

7. A composition of claim 2 or claim 3 where the Lewis acid is selected from the group consisting of $AlCl_3$, $ZnCl_2$, $CaCl_2$, acidic clays and acidic polymers or mixtures of these.

8. A composition of claim 2 or claim 3 where the composition includes an effective amount of plasticizer to improve the flexibility or adhesion of the film.

9. A composition of claim 2 or claim 3 where the composition includes an effective amount of a dispersing agent to improve the covering power of the pigment.

10. A composition of claim 2 or claim 3 where the composition includes an effective amount of a thickening agent to control settling of the dispersed ingredients.

11. A composition of claim 2 or claim 3 where the Lewis acid comprises $ZnCl_2$ and the composition includes a solvent for the Lewis acid.

12. A composition of claim 2 or claim 3 where the Lewis acid comprises $ZnCl_2$ and the composition includes ethanol as a solvent for the $ZnCl_2$.

13. A correction fluid composition consisting essentially of the following ingredients in amounts based on parts by weight of the total weight of the composition:

a. from about 80 to about 125 parts by weight of a non-flammable organic solvent having a boiling point between about 60° to about 85° C., b. from about 30 to about 70 parts by weight of a pigment comprising a titanium dioxide, c. from about 3 to about 20 parts by weight of a polymeric film-forming binder material which is soluble in said solvent, d. from about 0.5 to about 15 parts by weight of a Lewis acid selected from the group consisting of $AlCl_3$, $ZnCl_2$, $CaCl_2$, acidic clays and acidic polymers or mixtures of these, e. from 0 to about 10 parts by weight of a plasticizer to improve the flexibility or adhesion of the film, f. from 0 to about 10 parts by weight of a dispersing agent, and g. from 0 to about 5 parts by weight of a thickening agent.

14. A composition of claim 13 consisting essentially of the following ingredients in amounts based on parts by weight of the total weight of the composition:

a. from about 80 to about 125 parts by weight 1,1,1-trichloroethane, b. from about 30 to about 70 parts by weight of a titanium dioxide, c. from about 3 to about 20 parts by weight of a vinyl toluene acrylic polymer, d. from about 0.5 to about 15 parts by weight of $ZnCl_2$, e. from 0 to about 10 parts by weight of a plasticizer to improve the flexibility or adhesion of the film,
f. from 0 to about 10 parts by weight of a dispersing agent,
g. from 0 to about 5 parts by weight of a thickening agent, and
h. from about 0.5 to about 15 parts by weight of ethanol as a solvent for the $ZnCl_2$.

15. A composition for correcting a marking on the surface of a pressure-sensitive chemical recording medium including a developer material comprising an acidic developer, said marking having been provided by interaction of the developer material with a color-providing material, said composition consisting essentially of a substantially uniform dispersion of an opacifying pigment, a polymeric film-forming binder material, a solvent for the binder, and a Lewis acid selected from the group consisting of $AlCl_3$, $ZnCl_2$, $CaCl_2$, acidic clays, and acidic polymers or mixtures of these, and in amounts effective so that the dispersion forms a film which can cover the marking and can provide a visible corrected marking on contact with a pattern of said color-providing material corresponding to the corrected marking.

16. A composition of claim 15 where the color of the composition closely corresponds to the color of the surface having the marking.

17. A composition of claim 15 where the pigment binder and Lewis acid are dispersed in a non-flammable organic solvent having a boiling point between about 60° to about 85° C.

18. A composition of claim 15 where the pigment comprises a titanium dioxide.

19. A composition of claim 15 where the polymeric film-forming binder material comprises a vinyl toluene acrylic polymer.

20. A composition of claim 15 where the composition includes an effective amount of a dispersing agent to improve the covering power of the pigment.

21. A composition of claim 15 where the composition includes an effective amount of a thickening agent to control settling of the dispersed ingredients.

22. A composition of claim 15 where the Lewis acid comprises $ZnCl_2$ and the composition includes a solvent for the Lewis acid.

* * * * *